(12) United States Patent
Jarman

(10) Patent No.: US 6,418,989 B1
(45) Date of Patent: Jul. 16, 2002

(54) STANDING-STEM TIMBER HARVESTING SYSTEM

(76) Inventor: Philip S. Jarman, SJO 7029 P.O. Box 0255331, Miami, FL (US) 33102-5331

( * ) Notice: Subject to any disclaimer, the term of this patent is extended or adjusted under 35 U.S.C. 154(b) by 0 days.

(21) Appl. No.: 09/640,200

(22) Filed: Aug. 16, 2000

Related U.S. Application Data

(63) Continuation-in-part of application No. 09/084,203, filed on May 26, 1998, now Pat. No. 6,167,928, and a continuation-in-part of application No. PCT/CA99/00146, filed on Feb. 18, 1999.

(30) Foreign Application Priority Data

Feb. 19, 1998 (CA) .............................................. 2230045

(51) Int. Cl.$^7$ .............................................. A01G 23/08
(52) U.S. Cl. ....................... 144/336; 144/4.1; 144/34.1; 144/34.2
(58) Field of Search ............................ 56/8; 244/118.1, 244/137; 144/4.1, 34.1, 34.2, 34.3, 335, 336; 254/104

(56) References Cited

U.S. PATENT DOCUMENTS

| | | | |
|---|---|---|---|
| 3,457,977 A | * | 7/1969 | Andersson et al. ......... 144/336 |
| 3,667,515 A | | 6/1972 | Corey |
| 3,726,326 A | | 4/1973 | Coleman |
| 3,831,772 A | | 8/1974 | Jorgenson |
| 4,152,019 A | | 5/1979 | Jarman et al. |
| 4,451,024 A | * | 5/1984 | Sheperd ...................... 254/104 |
| 4,662,414 A | | 5/1987 | Fandrich |
| 4,815,263 A | | 3/1989 | Hartung et al. |
| 4,848,703 A | | 7/1989 | Coulson et al. |
| 4,881,582 A | | 11/1989 | Ketonen |
| 5,305,972 A | | 4/1994 | Hancocks |

FOREIGN PATENT DOCUMENTS

| | | |
|---|---|---|
| RU | 2014776 | 6/1994 |
| RU | 2095468 | 11/1997 |
| SU | 1074432 | 2/1984 |

* cited by examiner

Primary Examiner—W Donald Bray
(74) Attorney, Agent, or Firm—Robert H. Barrigar

(57) ABSTRACT

A method of standing-stem log harvesting including the steps of preparing a tree for harvesting and then harvesting the same directly from the stump. A tree is prepared for harvesting by topping the tree, cutting the tree part way through the trunk near ground level with two cuts lying in generally the same plane to leave holding wood between the resulting two generally parallel cut edges, and driving support wedges or the like into both said cuts to stabilize the tree trunk. The holding wood and the wedges maintain the trunk stable and upright until it is harvested, but the holding wood is readily frangible in response to a generally horizontal pivoting force applied to the trunk near the top thereof in a direction generally perpendicular to the cut edges. For harvesting, the prepared tree is gripped near the top thereof, and a generally horizontal force is applied to the trunk at the point of gripping in a direction generally perpendicular to the cut edges, thereby breaking the holding wood. The severed log is then hoisted and removed to a selected drop site. Apparatus for practising the standing-stem log harvesting method includes a helicopter and a grapple suspended generally under the center of gravity of the helicopter for gripping and hoisting the tree trunk.

16 Claims, 5 Drawing Sheets

STANDING-STEM TIMBER HARVESTING SYSTEM

RELATED APPLICATION DATA

This patent application claims priority from Canadian patent application No. 2,280,625 filed on Aug. 17, 1999, which in turn claims priority from Canadian patent application No. 2,251,236, filed on Oct. 21, 1998. The present application is a continuation-in-part of U.S. patent application Ser. No. 09/084,203 filed on May 26, 1998, now U.S. Pat. No. 6,167,928 and of PCT International Patent Application No. PCT/CA99/00146 filed Feb. 18, 1999, which designates the United States. U.S. patent application Ser. No. 09/084,203 claims priority from Canadian patent application No. 2,230,045, filed on Feb. 19, 1998, and PCT International Patent Application PCT/CA99/00146 claims priority from Canadian patent application No. 2,251,236, filed on Oct. 21, 1998.

FIELD OF THE INVENTION

This invention relates to a standing-stem timber harvesting system for harvesting topped tree trunks directly from the stump, preferably making use of a helicopter, but conceivably a dirigible, to sever, hoist and remove the harvested log.

BACKGROUND OF THE INVENTION

For selective harvesting of individual tree trunks, trees are conventionally individually felled and de-branched. Felling trees often causes damage to the felled tree trunk and invariably causes damage to undergrowth. Removal of the felled tree trunks (i.e., logs) is often difficult, particularly in rugged terrain. Helicopters may be used to pick up felled and trimmed logs and to carry them to a stacking area, to a watercourse, or even directly to a logging truck. One system of lifting and transporting felled timber is disclosed in Jarman U.S. Pat. No. 4,152,019 granted on May 1, 1979. The technique described in that patent requires that conventional felling procedures be used, which can damage the log and inevitably cause damage to the immediate area on which the felled tree falls.

Published Russian Patent Application No. RU 2,095,698 discloses a logging method in which the trunk of a standing tree is cut from two sides, leaving a connecting portion between the saw cuts. Wedges are driven into the saw cuts and vertical members of a securing device are mounted around the tree in such a manner that the connecting portion can later be sawed away. The connecting portion is eventually sawn away, leaving the cut tree standing on the stump (secured in place by the securing device). The cut tree can later be lifted clear by means of a helicopter. This method requires the acquisition of a number of securing devices, if a number of trees are prepared at the same time for being harvested before the arrival of the helicopter. Each such securing device has to be stocked, maintained, transported to the site, installed and removed. Such manipulation complicates the process and increases the overall cost of the logging. Further, according to this method, the ground crew must visit the tree twice, once to saw the tree part way through, and then again later to saw through the connecting portion. As terrain is often difficult, requiring the ground crew to visit the tree twice is time-consuming and expensive.

Despite these earlier methods, there remains a need for an improved method for selectively logging relatively large trees which is economical to utilize for many different situations. Helicopter-implemented techniques have been promising, but have heretofore suffered from disadvantages of which the above-described inadequacies are typical.

SUMMARY OF THE INVENTION

The invention is in one aspect a method of standing-stem log harvesting that allows a tree trunk to be harvested without felling. To this end, once severed from the stump, the tree trunk is removed directly upwards by means of a helicopter or equivalent airborne vehicle.

According to the method, a selected tree is first topped. Then, a first saw cut is made through the trunk of the tree near ground level. This first cut should extend generally horizontally into the tree trunk more than about half the diameter of the trunk at the point of cutting (i.e., more than about half a diameter generally perpendicular to the line defining the limit of cutting), and no more than about two-thirds of such diameter. Then a second cut through the trunk from the opposite side is made, terminating at a cut edge generally aligned with and generally parallel to the cut edge of the first cut, preferably in the same horizontal plane as the first cut, and separated from it by holding wood.

Note that in contradistinction to the two cuts conventionally made to fell a tree, which are conventionally vertically offset from one another, the two cuts of the method of the invention are in generally the same horizontal plane. Further, the present technique, again in contradistinction to conventional practice, does not require any notching of the tree prior to sawing; indeed, such notching would be counter-productive. By "holding wood" is meant a relatively narrow portion of uncut wood extending substantially from one side of the trunk to the other, and sufficiently thick and strong, with auxiliary support, to impede breaking by wind forces, etc. of the topped trunk away from what will become the stump. The auxiliary support conveniently is provided by driving support wedges into both cuts to stabilize the trunk, so that the wedges and the holding wood maintain the trunk stable and upright until it is harvested.

The holding wood is readily frangible in response to generally horizontal pivoting force applied to the trunk near the top in a direction generally perpendicular to the cut edges (and therefore generally perpendicular to the long dimension of the holding wood), thereby to cause the trunk to pivot about the holding wood, and to permit the trunk to be broken away from the stump for removal. The horizontal holding wood breaking force is preferably applied by a grapple supported by and suspended from a helicopter, as described below.

The selection of the thickness of the holding wood will depend upon a number of factors, including the length and diameter of the tree trunk to be harvested, the species of tree, prevailing conditions (especially susceptibility to strong winds), the forces applied by the helicopter rotor wash, and possibly other factors, and is best empirically determined.

When the log is ready to be harvested, a helicopter provided with a suitable grapple suspended underneath the helicopter manoeuvers into position over the tree trunk so that the grapple engages and grips the top of the trunk. Once the grapple grips the top of the trunk, then by moving the helicopter in a direction generally perpendicular to the cut edges (and thus the long dimension) of the holding wood, the helicopter is able to apply sufficient force to the trunk to break the holding wood. (In the process, the helicopter may dislodge some or all of the wedges.) It may be necessary to apply the horizontal pivoting force alternately in both directions perpendicular to the cut edges until the holding wood breaks. A ribbon or other marking may be affixed to the top of the topped tree trunk to indicate (to the helicopter pilot) the direction of the cuts made into the tree trunk, facilitating correct orientation of the helicopter movement required to break off the log from the stump. Once the holding wood is fractured, the helicopter then removes the severed log and carries it suspended in vertical orientation to a selected drop site.

It is conceivable that a dirigible could be substituted for a helicopter, although wind-related problems, slower and less agile maneuverability, and other negative factors associated with the use of a dirigible, would not be easily overcome.

Apparatus according to the invention suitable to implement the foregoing method comprises, in combination, a helicopter and a grapple carried by the helicopter for gripping and carrying the top of a topped standing tree trunk. The grapple in operation accordingly is oriented so that it grips the trunk while the trunk is vertical, in contradistinction to the orientation of grapples used to grip felled trees. The grapple is preferably of the jaws type, having opposed gripping jaws pivotally movable in a generally horizontal plane for engaging the tree trunk top. The grapple is operable from the helicopter for opening and closing thereof, so as to permit the grapple to releasably grip a tree trunk. The grapple is preferably suspended on a wire rope or other suitable load supporting line (sometimes referred to herein as a "support cable") underneath the center of gravity of the he copter. The load-supporting line should be sufficiently long that the grapple is within the field of vision of the pilot of the helicopter, and may be made longer or shorter as circumstances require. For example, if the forest canopy is relatively shallow, a shorter load-supporting line may be used; if the forest canopy is relatively deep, then a longer line can be used.

To facilitate guiding the grapple into engagement with the topped tree trunk, a guide line may be suspended under the nose of the helicopter and attached to the grapple, so that when the grapple is not bearing the load of the log, the grapple can be positioned generally vertically under the nose, facilitating the pilot's view of the grapple and facilitating engagement of the grapple with the topped tree trunk. The guide line should be sufficiently strong to support the weight of the grapple so that the grapple may hang more or less vertically under the nose. The use of a guide line also tends to impede spinning of the grapple on the support cable. Note that if the grapple at the end of the load-supporting line under the center of gravity of the helicopter is sufficiently visible to the helicopter pilot, and if the support line is sufficiently stiff so as to resist spinning of the grapple, no guide line is necessary. In such case, the support line is preferably a non-rotating line; such support lines are commercially available. To stabilize the grapple further, a gyroscopic stabilizing mechanism could be attached to the grapple, but this would increase the cost of manufacture of the equipment.

The guide line, if present, may be in part elastically extensible or may be connected by a recoiling device (line-winding drum or the like) to the helicopter so that its length may vary as between guiding mode and log suspension mode. When the grapple is not carrying a log, the grapple under the elastic or recoiling force moves forward underneath the nose of the helicopter for better visibility. Later, while when the grapple is carrying a log, the guide line elastically extends (or pulls out of the recoiling device) so that the grapple and the log it carries are positioned directly underneath the center of gravity of the helicopter, suspended by the support line. Since the guideline and associated apparatus add complexity and expense, a competent helicopter pilot may prefer to work without any guideline.

The apparatus required at ground level to effect the cuts and provide support for the partially severed trunk is largely conventional, including a conventional chainsaw and wedges. To facilitate the making of the two cuts with reasonable precision, a pair of elongate guide bars of width equal to the width of holding wood required can be mounted vertically oriented on opposite sides of the tree trunk. These guide bars are positioned somewhat offset from the ends of a selected diameter of the trunk such that the first saw cut made into the trunk to the limit of one pair of vertical side edges of the two guide bars is about one-half to two-thirds the diameter of the trunk, and the second cut to the limit of the other pair of vertical side edges of the guide bar leaves holding wood between the cuts equal to the width of each of the guide bars. (Note that although it is preferable to make the longer cut first, it can be made second, after sawing the shorter cut, as long as the deeper cut is made against the lean of the tree.) A set of guide bars of varying widths can be used to provide holding wood of correspondingly varying widths. The guide bars may be nailed to the trees and if desired may be removed for re-use after the two cuts have been made in a trunk. The guide bars are preferably made of plastic, aluminum, or some other material softer than the teeth of the chainsaw but providing resistance to cutting by the chainsaw, and are preferably made of cheap material in the event that they are discarded and not re-used.

Normally, the cutting and wedging operation at the base of the tree is completed before the helicopter is used to harvest the topped tree trunk as described above. But apparatus is known that combines sawing and gripping functions, although such apparatus has heretofore been used at ground level, and has not been adapted for airborne use. It is doubtful that such apparatus could be modified for airborne use in such a manner that its use would be both economical and safe, but in some circumstances, such modified helicopter-borne combined sawing and gripping apparatus could conceivably be used to top the tree, saw part way through its base, and then grip the top of the tree and pivot the tree to break the holding wood and to harvest the log. Note that in most situations, such apparatus could not effectively penetrate the forest canopy so as to be visible to the helicopter operator when the saw is to be used at the base of the tree, so if such apparatus could be effectively used, it would probably require auxiliary support from one or more ground crew personnel. Presumably a delimbing device would have to be added to delimb the tree sufficiently to enable the apparatus to reach the base of the tree. Further, the longer the supporting line for the sawing apparatus, the more difficult it becomes to manoeuver the apparatus into the correct position relative to the tree trunk. So this hypothetical technical solution using such modified combined sawing/delimbing/gripping apparatus appears to be unattractive.

DETAILED DESCRIPTION OF THE PREFERRED EMBODIMENT

Figure 1:
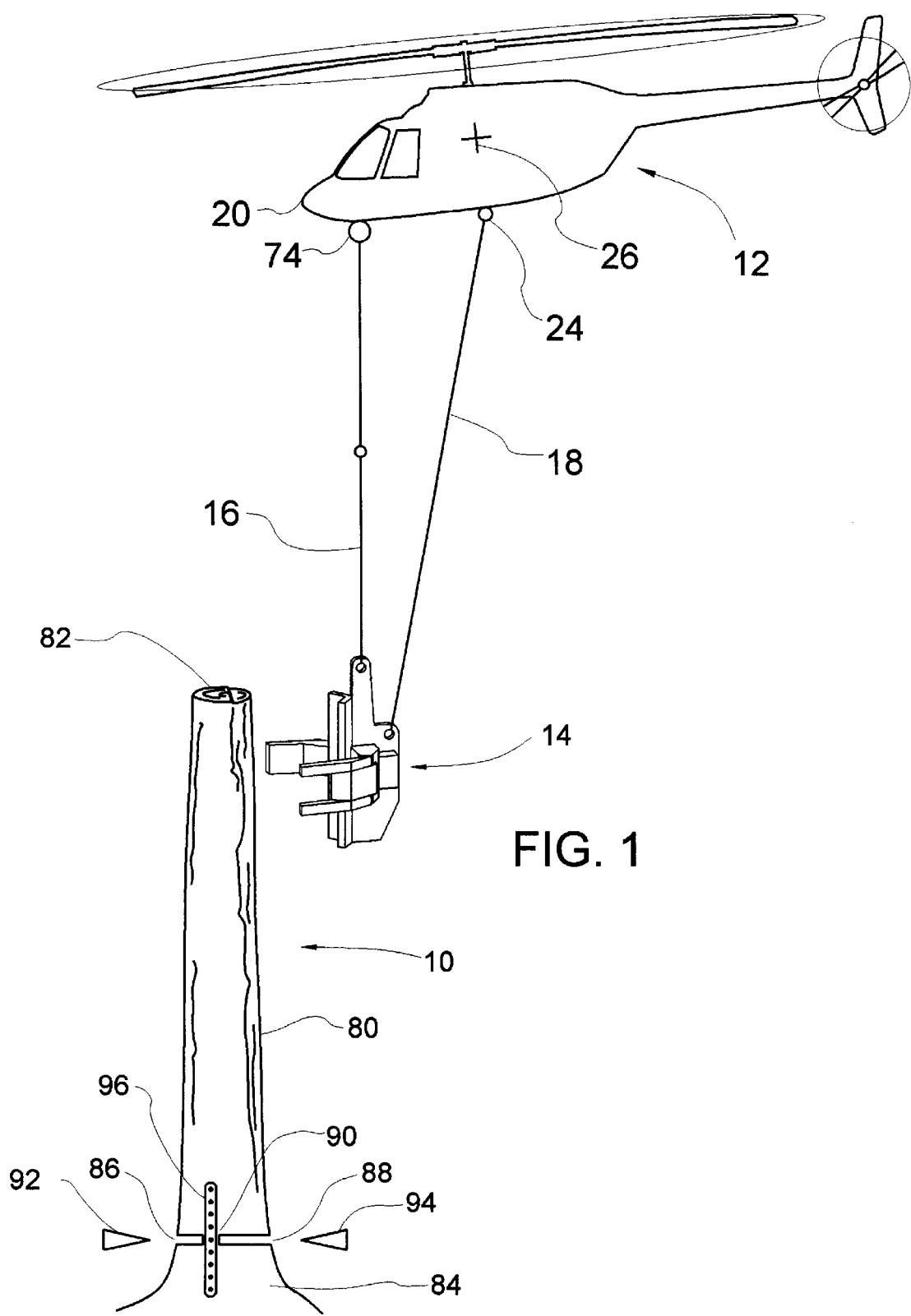
FIG. 1 is a schematic view partly in elevation and partly in perspective of a helicopter about to engage a topped and partially severed tree trunk with a grapple in a manner conforming to part of the preferred log harvesting method according to the invention.

Referring FIG. 1, a tree 10 has been selected for logging. Tree 10 has been topped and de-branched to the extent considered desirable, and what is left standing is a tree trunk 80 having a top portion 82 and a stump portion 84, the latter being close to the ground.

The tree trunk 80 is shown having been partially cut through by two generally horizontal sawcuts 86 and 88 on opposite sides of the trunk above what will be a residual stump 84 once the trunk 80 is harvested as a log. Once the tree 10 has been topped and de-branched, an initial cut 88 is made in the trunk extending into the trunk approximately two-thirds the diameter of the trunk. This cut 88 is preferably made against the lean of the tree. Wedges may be inserted into the cut 88 progressively as the cut proceeds. When the cut 88 is complete, the chainsaw bar is removed, and final support wedges 94 are positioned and driven to stabilize the trunk 80 at the outer peripheral portions of the cut 88.

The second cut 86 is then made preferably generally in the same horizontal plane as the first cut 88, but stopping short of the first cut so as to leave holding wood 90 between the first cut 88 and the second cut 86. Again, suitable wedges 92 are driven into the second cut 86 so as to support and stabilize the trunk 80 at the outer peripheral portions of the cut 86. The wedges 92, 94 are preferably taped in place with high-visibility tape to make them conspicuous and to help keep them in place if the tree trunk 80 rocks in the wind.

Figure 3:
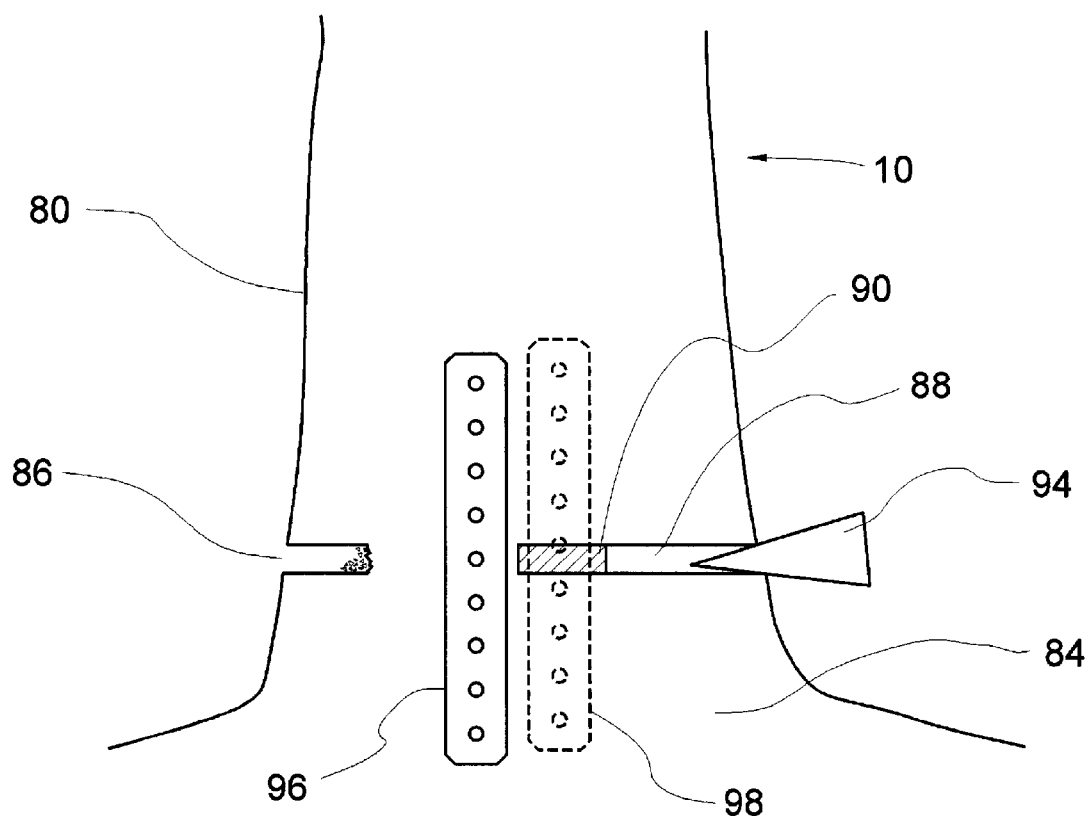
FIG. 3 is a schematic elevation view of a portion of a tree trunk showing two cuts of the trunk required by the procedure according to the invention, one of them incomplete, and illustrating an optional pair of oppositely mounted guide bars used to determine the extent of the cuts and thus the thickness of the holding wood.

As seen more clearly in FIG. 3, guide bars 96, 98 preferably constructed of plastic, aluminum, or some other material softer than the teeth of the chainsaw but providing resistance to cutting by the chainsaw, may be positioned on the tree trunk 80 to facilitate the accurate completion of cuts 88 and 86. As illustrated in FIG. 3, cut 88 has been completed, but cut 86 is in progress. When cut 86 has been completed, holding wood 90 will remain, identified in FIG. 3 by its section; the width of the holding wood 90 is slightly exaggerated relative to the phantom view of spacer bar (guide bar) 98 for clarity of the schematic illustration.

As mentioned above, the selection of the thickness of the holding wood 90 remaining after cuts 88, 86 are made will depend upon number of factors, including the length and diameter of the tree trunk to be harvested, the species of tree, prevailing conditions (especially susceptibility to strong winds), moisture content, the force components of the helicopter rotor wash (the "wind" created by the helicopter's rotating lift blades) and possibly other factors, and is best empirically determined. In most cases, the thickness of the holding wood (i.e. the distance between the cut edges of sawcuts 86, 88) is between about ¼" and about 2", and has in practice been found to lie almost always in the range between about ½" and 1". Note that since most of the stabilization force is provided by the wedges 92, 94, the holding wood 90 does not itself have to offer appreciable resistance to torque applied to the trunk 80 by wind loading.

When the trunk 80 is ready for harvesting, a helicopter 12 carrying a suitable grapple 14 approaches the trunk 80. The grapple 14 is preferably suspended on a fixed-length support cable 18 (preferably made of wire rope) from attachment point 24 mounted on the underside of the helicopter 12 beneath the center of gravity 26 of the helicopter 12 (and beneath its rotor shaft). The fixed length of cable 18 is fixed only for a given harvesting situation; the cable 18 may be made longer or shorter as circumstances require. For example, if the forest canopy is relatively shallow, a shorter cable 18 may be used; if the canopy is relatively deep, a longer cable 18 can be used.

Figure 2:
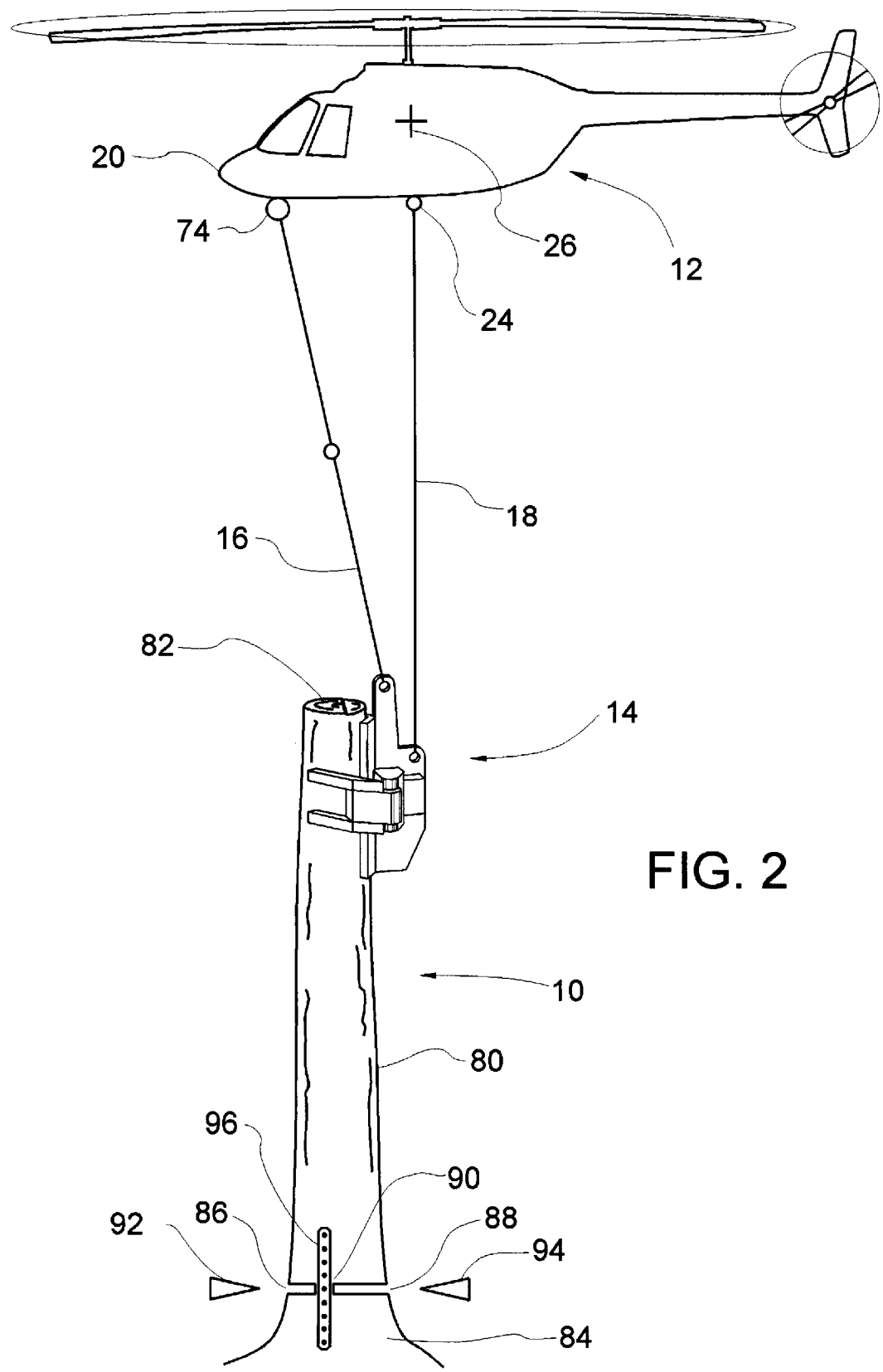
FIG. 2 is a schematic view partly in elevation and partly in perspective of a helicopter engaging a topped and partially severed tree trunk with a grapple, in a manner conforming to part of the preferred log harvesting method according to the invention.

In FIGS. 1 and 2, the various elements are not depicted to a consistent scale. The grapple 14 is oversize relative to the helicopter 12, and the tree trunk 80 is overly short. These drawings are schematic only.

Optionally, a guide line 16 may be suspended underneath the nose 20 of the helicopter 12 on a recoilable drum or winch 74 or the like. The recoilable drum 74 maintains enough tension on the guide line 16 to maintain the unloaded grapple 14 generally vertically suspended below the nose 20 so that the pilot may more easily view the grapple 14 and bring the grapple 14 into engagement with the trunk 80. The pilot's vision may be further facilitated by locating the drum 74 below and to one side of the pilot's seating position within the helicopter 12. Once the grapple 14 has engaged the top portion 82 of the trunk 80, the pilot closes the grapple 14 to grip the trunk 80, as illustrated in FIG. 2.

Figure 4:
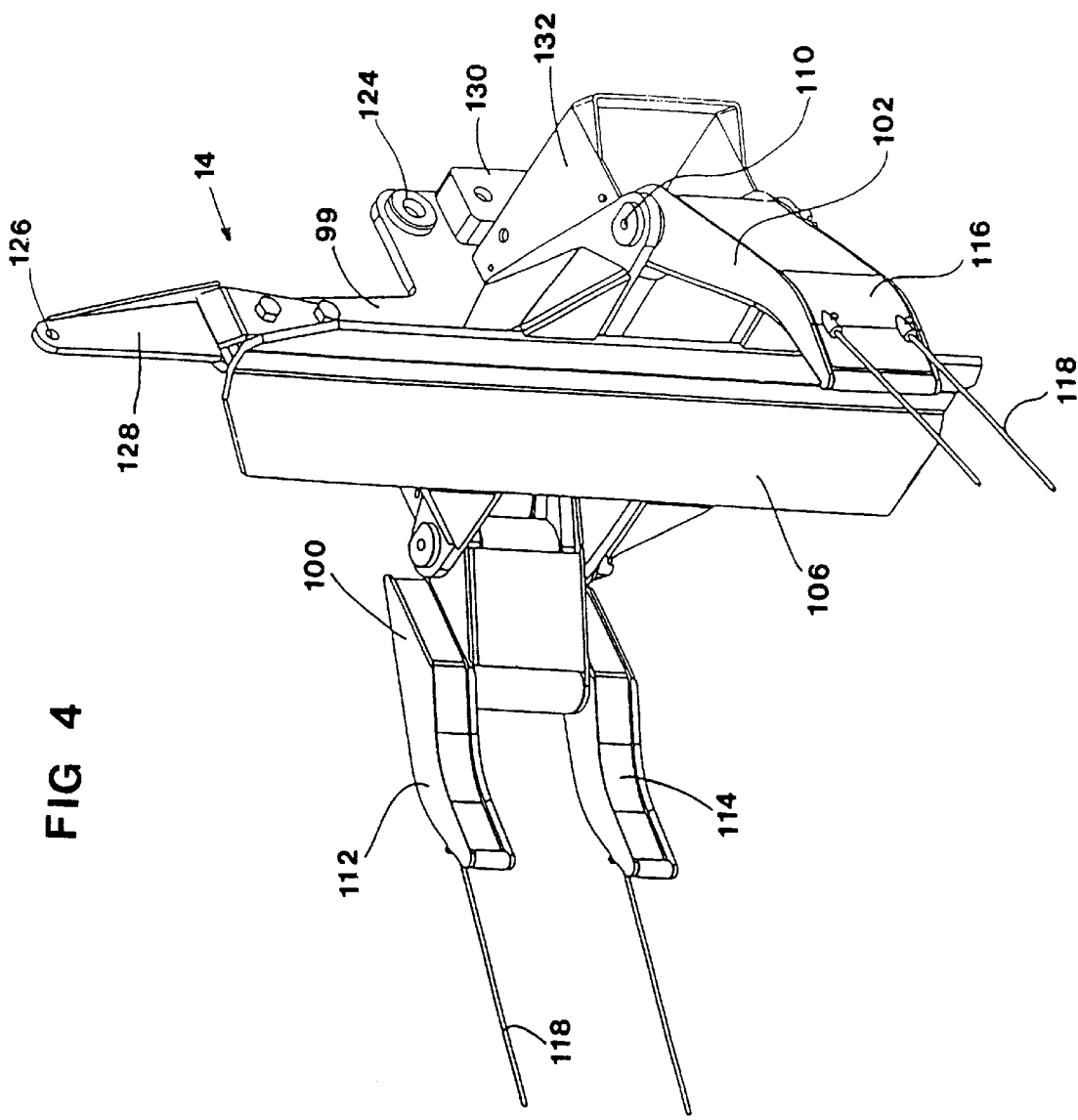
FIG. 4 is a schematic front perspective view of a grapple suitable for gripping logs pursuant to the preferred technique according to the invention.
Figure 5:
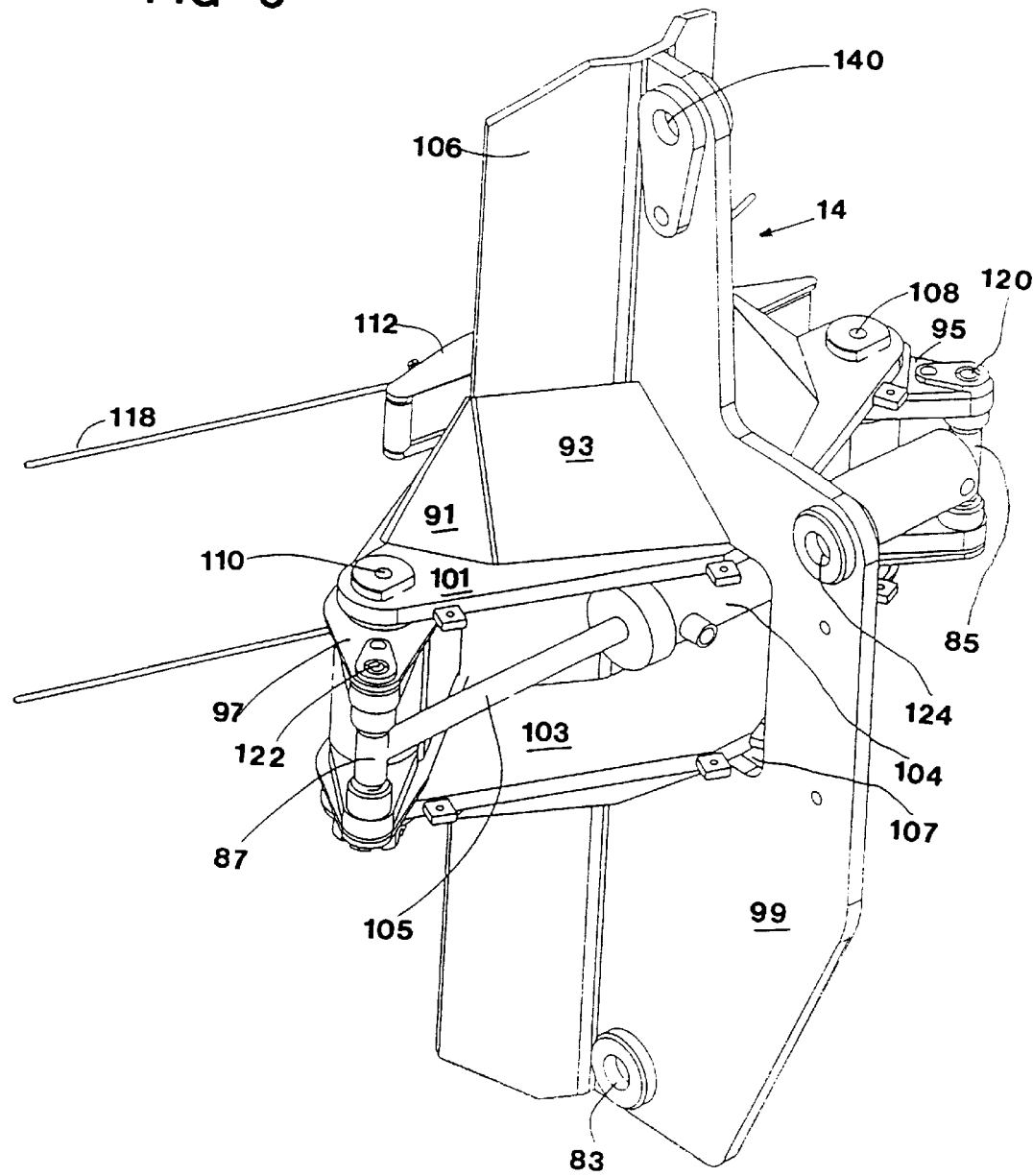
FIG. 5 is a schematic rear perspective view of the grapple of FIG. 4.

FIGS. 4 and 5 illustrate a preferred grapple 14, preferably made of steel. The grapple 14 includes a vertical backplate 106 welded to an upper horizontal cross-beam 101 and a lower horizontal cross-beam 103. A vertical flange 99 is welded to the spine of the rear surface of the backplate 106, extending generally rearwardly from the backplate 106. The flange 99 is provided with an aperture 107 whose upper limit is coincident with the upper horizontal cross-beam 101 and whose lower limit is coincident with lower horizontal cross-beam 103. For greater strength, the flange 99 may be welded to the cross-beams 101 and 103 along the surfaces of contact between the two. Additional reinforcing plates such as plates 91, 93 may be welded to two or more of the principal structural elements 99, 106, 101 and 103. (Recall that the terms "vertical" and "horizontal" are used in a relative, not an absolute, sense. The normal operating orientation of the grapple 14 is assumed.)

Between the upper horizontal cross-beam 101 and the lower horizontal cross-beam 103 are mounted vertical axles 108, 110 on which openable and closeable jaws 100, 102 are pivotally mounted. Each jaw 100, 102 is a welded composite of vertical and horizontal plates, the vertical plates being bent to the preferred configuration illustrated. The spaced upper and lower horizontal plates comprising structural portions of the composite structure of each of jaws 100, 102 extend generally rearwardly as crank arms 95, 97 respectively, each crank arm pair therefore comprising an upper and a lower horizontal component plate spaced from one another. Vertical pivot axles 120, 122 respectively pivotally connect the distal ends of crank arms 95, 97 with end bushings 85, 87 respectively at the distal ends of cylinder 104 and piston 105 respectively. The piston/cylinder hydraulic device 104, 105 is operated in conventional manner by a hydraulic pump and controls (not shown)

in the helicopter 12 to which the grapple jaws operating cylinder 104 is operatively connected by means of hydraulic supply lines (not shown). Apart from the location of the cylinder 104 and its associated piston 105, and the manner of linking of the jaws 100, 102 to cylinder 104 and piston 105, the entire hydraulic arrangement can be conventional. Note that cylinder 104 is pivotally connected to jaws 100, 102 at pivot axes 120, 122, but is otherwise not fixed to grapple 14; this arrangement prevents binding of operating cylinder 104 when jaws 100, 102 are opened and closed and allows asymmetrical closing of the jaws 100, 102. Note that the aperture 107 in flange 99 accordingly extends rearwardly sufficiently to enable cylinder 104 to move rearwardly without bearing against the adjacent aperture surface of flange 99.

In use, grapple 14 is suspended from support cable 18 at attachment point 124, and may optionally also be connected to guide line 16 at attachment point 126 on bracket 128, itself removably attached by bolts and nuts to the top of flange 99. (Bracket 128 is illustrated only in FIG. 4.) Alternatively, if no guideline is required, the support line could be connected to eye 140, in which case bracket 128 would not be present. Attachment point 124 is positioned on body 99 such that the combined weight of grapple 14 and a tree trunk being carried in the grapple 14 will result in the grapple 14 hanging substantially vertically. The location and spacing of connection points 124 and 140 are selected to optimize vertical orientation of the unloaded grapple 14 with and without a guideline present. An optional counterweight 130 (FIG. 4 only) may be provided to reinforce the tendency of the unloaded grapple 14 to hang substantially vertically. Further weights may be attached if desired to grapple 14 by means of eye 83 located near the bottom of flange 99.

Optionally, a guard plate 132 (FIG. 4) may be attached to the cross-beams 101, 103 to provide additional protective cover for cylinder 104 to reduce the likelihood of damage to cylinder 104.

The backplate 106 is generally vertically elongate and generally vertically oriented. It may be made of a single plate of steel suitably bent about vertical bend lines to form a generally concave bearing surface for bearing against the tree trunk (log) 80 to be gripped, the concave bearing surface following in a general way the curvature of the generally cylindrical trunk 80. Of course, the degree of concavity chosen for the bearing surface of the backplate 106 is necessarily a compromise, as the grapple 14 must cope with a range of log diameters. For gripping logs of widely disparate diameters, grapples 14 of different dimensions may be used.

The jaws 100, 102 are generally symmetrically disposed about the vertical center line of the backplate 106. The jaw 100 is preferably provided with vertically spaced fingers 112, 114 offset from finger 116 of jaw 102 so as to distribute (when the grapple 14 is operating) gripping force over the vertical extension of the fingers of the grapple, and so that the fingers do not interfere with one another when the jaws 100, 102 are closed. Although three fingers 112, 114, 116 are shown by way of illustration, a greater number of fingers (or wider fingers in the vertical sense) may also be used to advantage. The grapple design including the vertically elongate configuration of back plate 106, its concavity, and the provision of vertically spaced offset fingers 112, 114, 116 on jaws 100, 102 tends to distribute advantageously the gripping force required per contact surface area to grip and hoist the log 80, and thereby to minimize the damage caused to the log 80 by the grapple 14. As a result, such grapple 14 may be used to remove logs that are to be used intact as poles. Since the tree has not been felled and the log 80 undergoes minimal damage during harvesting, a log 80 thus harvested is sound, with minimal surface damage, and preferred for a number of applications, including for use as poles to support telephone or electric power cables.

The grapple 14 may be provided with wands 118 (made of steel rod or fiberglass or the like; fiberglass provides a good combination of strength and flexibility) whose proximate ends are welded or otherwise fixed to fingers 112, 114, 116 as illustrated. The wands 118 extend generally horizontally outwardly from the opposed jaws 100, 102 of the grapple 14 to facilitate the visibility of the grapple 14 to the helicopter pilot and to facilitate the engagement of the grapple 14 with the tree top 82. Such wands should be strong enough to withstand abuse but resilient to tolerate deflection as the grapple moves into engagement with the tree top.

It will be appreciated by persons skilled in the technologies relating to the methods and apparatus described above that many of the details provided above are by way of example only, and are not intended to limit the scope of the invention, which is defined in the following claims.

What is claimed is:

1. A method of preparing a tree for standing-stem harvesting directly from the stump, comprising
    a) topping the tree;
    b) cutting through the trunk of the tree near ground level to make a pair of generally horizontal saw cuts into the trunk, the deeper of which cuts is more than about half the diameter of the trunk at the point of cutting; the cuts terminating along cut edges generally parallel to one another and separated from one another by holding wood; and
    c) driving support wedges or the equivalent into both said cuts to stabilize the trunks;
        whereby the wedges and the holding wood maintain the trunk stable and upright until it is harvested, but the holding wood is readily frangible in response to a generally horizontal pivoting force applied to the trunk near the top thereof in a direction generally perpendicular to the cut edges, thereby to permit the trunk to be broken away from the stump for removal.

2. A method as defined in claim 1, wherein the saw cuts lie in generally the same horizontal plane.

3. A method as defined in claim 2, wherein the first of the two saw cuts made is less than about half the diameter of the trunk at the point of cutting.

4. A method as defined in claim 2, wherein the first of the two saw cuts made is the deeper of the two cuts and extends into the trunk to no more than about two-thirds of the diameter of the trunk at the point of cutting.

5. A method as defined in claim 4, wherein the deeper of the two cuts is made against the lean of the tree.

6. A method of standing-stem log harvesting, comprising:
    (a) preparing the tree for harvesting as defined in claim 1;
    (b) gripping the trunk near the top thereof;
    (c) applying a generally horizontal force to the trunk at the point of gripping in a direction generally perpendicular to the edges of the cuts along the holding wood, thereby breaking the holding wood; and
    (d) hoisting and removing the severed log to a selected drop site.

7. A method as defined in claim 6, wherein the gripping, application of horizontal force, and removal are effected by a helicopter equipped with a suspended grapple for engaging and gripping the trunk.

8. A method of standing-stem log harvesting, comprising:

(a) preparing the tree for harvesting as defined in claim 2;

(b) gripping the trunk near the top thereof;

(c) applying a generally horizontal force to the trunk at the point of gripping in a direction generally perpendicular to the edges of the cuts along the holding wood, thereby breaking the holding wood; and (d) hoisting and removing the severed log to a selected drop site.

9. A method as defined in claim 8, wherein the gripping, application of horizontal force, and removal are effected by a helicopter equipped with a suspended grapple for engaging and gripping the trunk.

10. A method of standing-stem log harvesting, comprising:

(a) preparing the tree for harvesting as defined in claim 5;

(b) gripping the trunk near the top thereof;

(c) applying a generally horizontal force to the trunk at the point of gripping in a direction generally perpendicular to the edges of the cuts along the holding wood, thereby breaking the holding wood; and (d) hoisting and removing the severed log to a selected drop site.

11. A method as defined in claim 10, wherein the gripping, application of horizontal force, and removal are effected by a helicopter equipped with a suspended grapple for engaging and gripping the trunk.

12. In a method of logging the topped trunk of a tree, the trunk being sawn part way through by means of cuts immediately above the stump thereof, leaving holding wood connecting an upper portion of the trunk above the cut to a lower stump portion of the trunk below the cut, the trunk thereafter being engaged by a trunk-hoisting grapple on a line suspended from a helicopter, the improvement comprising:

selecting the holding wood to be of a thickness when reinforced only by wedges driven into the cuts to provide structural integrity of the partly sawn-through trunk with the stump thereby to stabilize the trunk, while being readily frangible in response to a generally horizontal pivoting force applied by the helicopter via the grapple to the trunk near the top thereof in a direction generally perpendicular to the edges of the cuts; and moving the helicopter (that has engaged the trunk via the grapple) away from the line of the trunk axis, thereby applying the generally horizontal pivoting force to the top of the trunk and breaking the holding wood, thereby allowing the helicopter to carry the upper portion of the trunk away from the remaining stump.

13. The improvement of claim 12, wherein the helicopter suspends the trunk in substantially vertical orientation when carrying the trunk away.

14. A method as defined in claim 13, wherein the saw cuts on either side of the holding wood lie in generally the same horizontal plane, one being deeper than the other.

15. The improvement of claim 14, wherein the selection of holding wood thickness is made by fastening two guide bars of selected substantially identical width in a generally vertical orientation to opposed sides of the tree trunk at positions such that the vertical side edges of the guide bars define the limits of the two saw cuts, then sawing the trunk substantially to the limits defined by the side edges of the guide bars; wherein the width of the guide bars is selected to coincide substantially with the selected width of the holding wood.

16. The improvement of claim 15, wherein the guide bars are made of disposable material softer than saw teeth but offering resistance to sawing.

* * * * *